United States Patent Office 3,309,029
Patented Mar. 14, 1967

3,309,029
ACTIVATION OF SULFIDE ORES FOR FROTH FLOTATION
George A. Frame, Copper Cliff, Ontario, Canada, assignor to The International Nickel Company, Inc., New York, N.Y., a corporation of Delaware
No Drawing. Filed May 7, 1964, Ser. No. 365,822
Claims priority, application Canada, Sept. 9, 1963, 884,147
5 Claims. (Cl. 241—20)

The present invention relates to the recovery of sulfides of nickel, copper and iron from their ores by flotation, and more particularly to the improved activation of sulfide ore for the increased recovery of nickel, copper and iron sulfides therefrom.

Heretofore, the art has used and proposed a variety of reagents and procedures for recovering sulfides from their ores by flotation techniques. Sulfide minerals such as pentlandite, chalcopyrite, pyrrhotite, chalcocite, sphalerite, pyrite and galena are all removed from their ores by flotation means.

In a typical operation involving the flotation of copper-containing nickeliferous sulfide ores the ore is ground to about 50% through 200 mesh and the finely divided ore, suspended in water as a pulp, is passed to the flotation machines. The pulp is maintained alkaline by using lime, potassium pentasol xanthate is used as a collector and pine oil is used as a frother. Sodium silicate is utilized to maintain a pulp dispersion. In floating off a bulk concentrate, recovery of about 92% of the nickel and 96% of the copper is possible by this technique. Thus, in treating an ore containing about 1% each of both nickel and copper by this technique, a tailing with nickel and copper contents of about 0.10% and 0.05%, respectively, is obtained.

It can be seen, then, that even though good recovery is attained in treating nickel- and copper-containing sulfide ores by standard techniques, there are still fairly high amounts of nickel and copper values in the tailings from the flotation circuit which go to waste. Development of economic flotation improvements which would reduce the sulfide values in tailings now obtained in the art have been long sought after. Many attempts have been made to overcome the difficulties which have been encountered in the development of such improvements but none, as far as I am aware, was entirely successful when carried into practice commercially on an industrial scale.

It has now been discovered that recovery of pentlandite, chalcopyrite and pyrrhotite from nickeliferous sulfide ores by milling and flotation can be increased by adding activating amounts of copper sulfate and ammonia to the ore being treated.

It is an object of the present invention to provide a novel flotation process for improving the recovery of nickel and copper sulfides from their ores.

Another object of the invention is to provide a novel combination of activating agents by which tailing loss is reduced in the flotation of sulfide ores containing nickel, copper and iron.

The invention also contemplates providing a novel means for improving the flotation of copper-containing, nickeliferous sulfide ores while at the same time reducing the amount of dispersion agent required for the flotation.

It is a further object of the invention to provide a novel combination of activating and collecting agents to improve the floatability of sulfide minerals containing nickel, copper and iron.

Other objects, advantages and features of the present invention will become apparent from the following description.

Generally speaking, the present invention contemplates preparing a pulp of the sulfide ore to be floated by grinding with water and adding activating amounts of both copper sulfate and ammonia to the pulp of ore. The activating compounds are most advantageously added with the ore to the grinding mills with addition to the mill discharge, flotation heads or part way through the flotation operation, however, providing definite beneficial effects. Although, preferably, addition of the activating compounds as an aqueous solution of the copper ammonium sulfate complex, $Cu(NH_3)_4SO_4 \cdot H_2O$ and free ammonia to the circuit is the most convenient and effective procedure, the compounds may be added singly to the milling and flotation circuit with each one being added even to different parts of the circuit. Ammonia addition rates in the order of between 0.1 and 5 pounds per ton of ore and copper sulfate additions in the order of between 0.1 and 1 pound per ton of ore, based on the hydrated salt containing $5H_2O$, are found to be satisfactory. Generally speaking, however, addition rates above 2 pounds of ammonia and 0.5 pound of copper sulfate per ton of ore yield little, if any, further benefit. Addition rates at the higher end of these ranges are generally most advantageous for ores requiring treatment at low pulp density or which are difficult to activate. Conversely, the lower addition rates are used for ores treated at high pulp density or requiring comparatively little activation. With some ores it is to be noted that ammonia addition rates at the higher end of these ranges might tend to decrease mineral recovery. Thus, with some nickeliferous ores containing pentlandite and pyrrhotite minerals, at high ammonia addition rates pentlandite recovery is found to decrease even though pyrrhotite recovery increases. In any case, addition rates of ammonia and copper sulfate required for any particular ore can be quite readily ascertained by the mill operator.

As previously set forth, the most advantageous procedure for adding these activating reagents is to add them to the mills as a solution. It is believed that addition of the soluble complex and free ammonia yields the highest concentration of dissolved copper in the mills where most of the activation by copper occurs. It is believed that the ammonia increases the solubility of the copper in the pulp. Addition of the ammonia and copper sulfate as crystals of the copper complex or as crystals of copper sulfate and ammonium hydroxide appears to yield lower amounts of dissolved copper in the mills than when the reagents are added as a solution of the copper-ammonia complex. Although activation appears most efficient when adding the reagents to the mill, as can be seen by test results following, activating reagent addition later in the flotation circuit such as to the flotation heads or scavenger heads has definite beneficial effect.

It is usually advisable, when activating sulfide ores of nickel, copper and iron by the hereindescribed process, to use a weaker collector in flotation heads than that used without activation. Use of a strong collector often results in bubbles breaking down from the very heavy load of sulfides and sufficient froth depth may not be obtained to skim it from the cells. Use of a weaker collector is particularly advantageous in large plant cells where pulp level control is less accurate. It is found, however, that some low grade or very slow floating ores which have been activated do not require a weaker collector. In particular, strong collectors are found to cause no problems when used in scavenging operations in the presence of the novel activating mixture of the invention.

Use of less pulp dispersing reagent, e.g., sodium silicate, is found possible when adding the copper sulfate and ammonia activating agents to the ore. Minimum tailing loss is obtainable only when sufficient pulp dispersing reagent is added to the ore pulp to yield a fairly bright froth. This bright froth is maintained with lesser additions of dispersing reagent when the novel activating mixture has been added.

In carrying the invention into practice, it is preferred to add the ammonia and copper sulfate activators to a pulp which has a pH adjusted in the alkaline range. It is doubtful that ammonia has any value in an acid pulp since the copper solubility is high enough without use of a complexing reagent. Use of the novel activating mixture is found to improve the flotation recoveries of pentlandite, chalcopyrite and pyrrhotite minerals from nickel- and copper-containing sulfide ores. Flotation of pyrrhotite is most advantageously affected as can be seen by test results outlined hereinafter. The alkali xanthates and dithiophosphates are effective collecting agents to be utilized, with the weaker members of both series of collectors, generally speaking, being most advantageous with fast floating ores as set forth hereinbefore.

The improved metal recoveries obtained by utilizing the novel method of the present invention in the flotation of a nickel-copper sulfide ore containing 0.8% nickel and 0.8% copper are shown by the results of plant scale tests outlined in Table A. The flotation circuits for the tests with and without activation were identical, with feed to the grinding mills taken from the same bin. Each of the tests in both circuits was carried out for a period of one week on a large plant scale. Each of the assays shown is the average of about 20 analyses. In the tests using ammonia and copper sulfate for activation, 0.2 pound of copper sulfate and 0.4 pound of ammonia per ton of ore were added and 0.04 pound of Aerofloat collector per ton of ore were used. In the circuit to which the activation mixture was not added, the same amount of copper sulfate and 0.06 pound of amyl xanthate collector per ton of ore were used. Amyl xanthate addition to the scavenger circuits was the same for each test.

pound per ton of ore, respectively. Amyl xanthate collector was also used in the rougher and scavenger circuits at the rate of 0.01 and 0.02 pound per ton, respectively. Frother was added at the rate of 0.15 pound per ton of ore. Another test was carried out on the same ore but this time only copper sulfate was utilized with ammonia being omitted. The ore received the same grind but only amyl xanthate collector was used at the rate of 0.04 and 0.08 pound per ton of ore in the rougher and scavenger circuits, respectively. Frother was used at the rate of 0.20 pound per ton of ore. Results of these two tests are shown in Table I following. Tests C identify those carried out using both the activating agents ammonia and copper sulfate and Tests D identify those using copper sulfate only. The beneficial effects of using both ammonia and copper sulfate are obvious from a comparison of the results of Tests C and D. From these results it can be seen that loss of nickel values in tailing was reduced by over 24% and copper loss to tailing by over 32% with the utilization of both the ammonia and copper sulfate activating agents. At the same time loss of pyrrhotite to tailing was reduced by almost 80%.

TABLE I

| Tests | Product | Weight percent | Analyses, percent | | | Recoveries, percent | | |
|---|---|---|---|---|---|---|---|---|
| | | | Ni | Cu | S | Ni | Cu | Po |
| C | Concentrate | 49.0 | 4.06 | 2.24 | 29.9 | 97.5 | 97.3 | 98.9 |
| | Tailing | 51.0 | 0.09 | 0.06 | 0.4 | | | |
| D | Concentrate | 47.7 | 4.05 | 2.36 | 29.5 | 96.7 | 96.0 | 94.7 |
| | Tailing | 52.3 | 0.125 | 0.09 | 1.4 | | | |

Note.—Po denotes pyrrhotite.

Example II

Another copper-nickel sulfide ore of lower grade than that treated in Example I and containing 0.9% nickel, 0.9% copper and 5.0% sulfur was subjected to flotation tests using both ammonia and copper sulfate activators in one test series and copper sulfate only in a second test series as in Example I. In both tests the ore was ground to 15% plus 65 mesh. In the first tests (Tests E) 0.20 pound of copper sulfate and 0.4 pound of ammonia per ton of ore were added to the mill while in the second tests (Tests F) only 0.20 pound of copper sulfate were added. Flotation reagents added to Tests E were 0.04 pound per ton of Aerofloat collector to the rougher cells and 0.06 pound per ton of Aerofloat collector and 0.02 pound per ton of amyl xanthate collector to the scavenger cells. In

TABLE A

| Series | A—Ammonia and Copper Sulfate | | B—Copper Sulfate Only | | Percent Decrease in Tailing Assay for Tests A over B | |
|---|---|---|---|---|---|---|
| | Tailing Percent Ni | Analysis Percent Cu | Tailing Percent Ni | Analysis Percent Cu | Ni | Cu |
| W1 | 0.097 | 0.044 | 0.106 | 0.051 | 8.5 | 13.7 |
| W2 | 0.095 | 0.044 | 0.103 | 0.050 | 7.8 | 12.0 |
| W3 | 0.088 | 0.046 | 0.094 | 0.049 | 6.4 | 6.1 |

For the purpose of giving those skilled in the art a better understanding of the invention the following illustrative examples are given:

Example I

A copper-containing nickeliferous sulfide ore, containing 2.0% nickel, 1.1% copper and 15% sulfur, was ground to 15% plus 65 mesh in a mill to which 1.0 pound per ton of ammonia and 0.2 pound per ton of copper sulfate had been added. The prepared pulp was passed to a flotation machine and a bulk copper-nickel concentrate was floated off. Aerofloat collector was added to the rougher and scavenger cells at the rate of 0.03 and 0.015

Tests F, 0.04 pound and 0.08 pound per ton of amyl xanthate collector was used in the rougher and scavenger cells, respectively. Tests E and F utilized 0.15 and 0.20 pound per ton, respectively, of frother. Results of these tests are presented in Table II, following. Again, with these tests the beneficial effect of using the novel combination of copper sulfate and ammonia for activation can be seen by the increased recoveries and resultant lower tailing losses. Vastly improved recovery of pyrrhotite (Po) is particularly evident. Tailing losses of nickel and copper are seen to be decreased in the order of 12% and 17%, respectively. Pyrrhotite tailing loss is greatly reduced by about 88%.

TABLE II

| Tests | Product | Weight percent | Analyses, percent | | | Recoveries, percent | | |
|---|---|---|---|---|---|---|---|---|
| | | | Ni | Cu | S | Ni | Cu | Po |
| E | Concentrate | 20.2 | 3.95 | 3.93 | 23.1 | 93.0 | 97.1 | 98.3 |
| | Tailing | 79.8 | 0.075 | 0.03 | 0.18 | | | |
| F | Concentrate | 19.0 | 4.44 | 4.72 | 23.0 | 92.0 | 96.5 | 85.9 |
| | Tailing | 81.0 | 0.04 | 0.04 | 0.68 | | | |

*Example III*

A low-copper nickeliferous sulfide ore with nickel, copper and sulfur contents of 1.3%, 0.10% and 11%, respectively, was subjected to two series of flotation tests, firstly using both copper sulfate and ammonia for activation purposes and secondly using only copper sulfate. The ore was ground to 32% plus 200 mesh and 0.04 pound per ton in the rougher cells and 0.08 pound per ton in the scavenger cells of amyl xanthate collector and 0.30 pound per ton of frother were added for all tests. In the tests using copper sulfate and ammonia for activation (Tests G) 0.20 pound per ton and 2.0 pounds per ton of copper sulfate and ammonia, respectively, were added to the mill and in the tests using copper sulfate only (Tests H) 0.20 pound per ton of copper sulfate was added to the mill. Results of these tests are shown in Table III, following. These test results show impressive improvement in recovery of nickel, copper and especially pyrrhotite by using the novel mixture of activating reagents of the present invention. As can be seen from tailing analyses and recoveries, loss to tailings was reduced in the order of 57%, 44% and 79% for nickel, copper and pyrrhotite, respectively.

TABLE III

| Tests | Product | Weight percent | Analyses, percent | | | Recoveries, percent | | |
|---|---|---|---|---|---|---|---|---|
| | | | Ni | Cu | S | Ni | Cu | Po |
| G | Concentrate | 34.1 | 3.5 | 0.20 | 26.4 | 89.2 | 77.6 | 84.3 |
| | Tailing | 65.9 | 0.22 | 0.03 | 2.5 | | | |
| H | Concentrate | 18.6 | 5.5 | 0.033 | 18.9 | 74.6 | 59.8 | 26.3 |
| | Tailing | 81.4 | 0.42 | 0.05 | 9.0 | | | |

As previously set forth, the activation of the ore must be carried out with both ammonia and copper sulfate. The tests outlined in Example IV illustrate the necessity of adding both ammonia and copper sulfate in order to obtain the most beneficial effects on flotation of the ore.

*Example IV*

Four series of tests were carried out on the same ore as tested in Example III, containing 1.3% nickel, 0.10% copper and 11% sulfur. In the first series (Tests J) neither copper sulfate nor ammonia was added to the flotation circuit. In the second series (Tests K) only copper sulfate was added to the mill at the rate of 0.20 pound per ton of ore. In the third series (Tests L) only ammonia was added to the mill at the rate of 2.0 pounds per ton. In the fourth series (Tests M) both copper sulfate and ammonia were added to the mill at the rate of 0.20 pound and 2.0 pounds, respectively, per ton of ore. The ore was ground to 32% plus 200 mesh for all the tests and frother was used at the rate of 0.30 pound per ton of ore. Amyl xanthate collector was used in all the tests at the rate of 0.04 pound per ton of ore in the rougher cells and 0.08 pound per ton in the scavenger cells. The results of these tests outlined in Table IV, following, illustrate the very great improvement in recovery by flotation when using both copper sulfate and ammonia activators over using neither or copper sulfate alone and also the improvement over using ammonia alone. The improvement shown by these tests in pyrrhotite recovery is seen to be most spectacular with recovery increased in the order of 250%.

TABLE IV

| Tests | Product | Weight, percent | Analyses, percent | | | Recoveries, percent | | |
|---|---|---|---|---|---|---|---|---|
| | | | Ni | Cu | S | Ni | Cu | Po |
| J | Concentrate | 16.8 | 5.9 | 0.39 | 18.5 | 75 | 57.7 | 24 |
| | Tailing | 83.2 | 0.40 | 0.06 | 8.5 | | | |
| K | Concentrate | 18.6 | 5.5 | 0.33 | 18.9 | 74.6 | 59.8 | 26.3 |
| | Tailing | 81.4 | 0.42 | 0.05 | 9.0 | | | |
| L | Concentrate | 27.7 | 3.9 | 0.26 | 22.4 | 86.2 | 71.3 | 53.4 |
| | Tailing | 72.3 | 0.24 | 0.04 | 6.5 | | | |
| M | Concentrate | 34.1 | 3.5 | 0.20 | 26.4 | 89.2 | 77.6 | 84.3 |
| | Tailing | 65.9 | 0.22 | 0.03 | 2.5 | | | |

Although addition of ammonia and copper sulfate directly to the mill feed, advantageously as the copper-ammonia complex, has most beneficial effects, addition to flotation heads and even part way through the flotation circuit results in considerable improvement as shown by the tests in Example V. Also, addition of ammonia and copper sulfate separately to different parts of the circuit can be carried out with beneficial results.

*Example V*

A series of tests were run on the same ore as treated in Examples III and IV. Ore grinding and use of collector and frother was carried out in the same way as in these last two examples. Addition of copper sulfate and ammonia activators was made to different parts of the flotation circuit with one test series conducted using no activators. Thus, in Tests N, no copper sulfate or ammonia were added to the circuit. In Tests P, R, S and T, copper sulfate and ammonia were added to the circuit at the rate of 0.2 pound per ton of ore and 2.0 pounds per ton, respectively. In Tests U, copper sulfate was added at the rate of 0.2 pound per ton but ammonia at the rate of 0.5 pound per ton. In Tests P and R, reagents were added to the flotation heads for Tests P and the scavenger heads for Tests R. In Tests S, copper sulfate was added to the mill and ammonia to flotation heads. In Tests T and U, both reagents were added to the mill. It is to be noted from the results of these tests as outlined in Table V that a considerable improvement in recoveries of nickel, copper and pyrrhotite results no matter to what part of the flotation circuit copper sulfate and ammonia are added. It is to be noted in particular that a very beneficial effect comes from adding both reagents to the same part of the circuit. The test results in Table V again clearly show the very beneficial effects on pyrrhotite recovery of adding copper sulfate and ammonia to the flotation circuit. It has been found that the effect on copper recoveries of adding copper sulfate and ammonia to ores which are low in copper, such as the one treated in the tests of this example containing only 0.1% copper, is somewhat erratic for short test series as can be seen by the copper recovery data in Table V and in particular for Test P which gives the results of only one test run. Increased copper recoveries are shown conclusively on plant scale tests, the results of some of which are shown in Table A hereinbefore.

Referring to Tests T and U, it is to be noted that for this particular ore additions of 0.5 pound per ton of ammonia to the circuit is less effective than the addition of 2 pounds per ton. Regulation of the amounts of copper sulfate and ammonia activators to be added to a particular type of ore is found to be very easily carried out by the mill operator.

TABLE V

| Tests | Product | Weight, percent | Analyses, percent ||| Recoveries, percent |||
|---|---|---|---|---|---|---|---|---|
| | | | Ni | Cu | S | Ni | Cu | Po |
| N | Concentrate | 16.8 | 5.9 | 0.39 | 18.5 | 75 | 58 | 24 |
|   | Tailing | 83.2 | 0.40 | 0.06 | 8.5 | | | |
| P | Concentrate | 37.3 | 3.0 | 0.13 | 25.4 | 88 | 56 | 88 |
|   | Tailing | 62.7 | 0.25 | 0.06 | 2.2 | | | |
| R | Concentrate | 38.7 | 3.0 | 0.20 | 22.6 | 88 | 76 | 83 |
|   | Tailing | 61.3 | 0.24 | 0.04 | 2.8 | | | |
| S | Concentrate | 31.6 | 3.4 | 0.17 | 20.6 | 85 | 66 | 62 |
|   | Tailing | 68.4 | 0.28 | 0.04 | 5.2 | | | |
| T | Concentrate | 34.1 | 3.5 | 0.20 | 26.4 | 89 | 78 | 84 |
|   | Tailing | 65.9 | 0.22 | 0.03 | 2.5 | | | |
| U | Concentrate | 26.7 | 4.2 | 0.37 | 22.8 | 82 | 73 | 54 |
|   | Tailing | 73.3 | 0.34 | 0.05 | 6.0 | | | |

A further advantage obtained by activating an ore pulp to be subjected to flotation according to the hereindescribed process is, as aforementioned, the reduction in amounts of pulp dispersion reagent necessary to maintain a bright froth and keep tailing loss at a minimum. Thus, when using ammonia and copper sulfate for activating sulfide pulps, not only is tailing loss lowered substantially but also pulp dispersion reagent consumption is lowered while maintaining this lower tailing loss. Thus, it has been found that in plant scale operation average sodium silicate addition to a flotation circuit treating a certain cupriferous and nickeliferous ore is about 0.44 pound per ton of ore when using copper sulfate and ammonia addition according to the hereindescribed novel process, whereas an average of 0.62 pound per ton of sodium silicate pulp dispersing reagent addition was necessary when not utilizing the copper sulfate-ammonia activation. A saving of nearly 30% in pulp dispersing reagent was realized, then, with this particular ore.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. An improved bulk flotation process for separating gangue from a sulfide ore of a metal from the group consisting of nickel, copper and iron which comprises grinding said ore in water which contains, per ton of ore being treated, copper sulfate in amounts of between about 0.1 and 1 pound, based on the hydrated salt, $CuSO_4 \cdot 5H_2O$, and ammonia in amounts not exceeding about 5 pounds with said ammonia being present in amounts, on a weight basis, exceeding the amount of copper sulfate to form a pulp, said copper sulfate and ammonia being added as an aqueous solution of a copper ammonium sulfate complex and free ammonia, and thereafter subjecting said pulp to a froth flotation operation in the presence of at least one frothing agent and at least one collecting agent while maintaining said pulp alkaline to recover sulfide minerals therefrom.

2. A process as described in claim 1 wherein a weak collecting agent is employed.

3. An improved bulk flotation process for separating gangue from a sulfide ore of a metal from the group consisting of nickel, copper and iron which comprises grinding said ore in water which contains activating amounts of ammonia and copper sulfate to form a pulp, said ammonia being present, on a weight basis, in amounts of at least about twice the amount of copper sulfate to provide an aqueous solution of a copper ammonium sulfate complex and free ammonia and thereafter subjecting said pulp to a froth flotation operation in the presence of at least one frothing agent and at least one collecting agent while maintaining said pulp alkaline to recover sulfide minerals therefrom.

4. A process as described in claim 3 wherein copper sulfate in amounts of between about 0.1 and 1 pound per ton of ore based on the hydrated salt, $CuSO_4 \cdot 5H_2O$, and ammonia in amounts not exceeding about 5 pounds per ton of ore are employed.

5. A process as described in claim 4 wherein the amount of copper sulfate does not exceed about 0.5 pound and the amount of ammonia does not exceed about 2 pounds.

References Cited by the Examiner

UNITED STATES PATENTS

| | | | |
|---|---|---|---|
| 1,334,420 | 3/1920 | Terry | 209—166 X |
| 1,735,190 | 11/1929 | Warren | 209—167 |
| 1,970,808 | 8/1934 | Macdonald | 209—167 |
| 1,974,218 | 9/1934 | Ruth | 209—167 |

FOREIGN PATENTS 640,751   5/1962   Canada.

FRANK W. LUTTER, *Primary Examiner.*

HARRY B. THORNTON, R. HALPER,
*Assistant Examiners.*